Nov. 27, 1928.
V. P. RUMELY
1,693,184
VEHICLE ANCHORING DEVICE
Filed Jan. 30, 1925
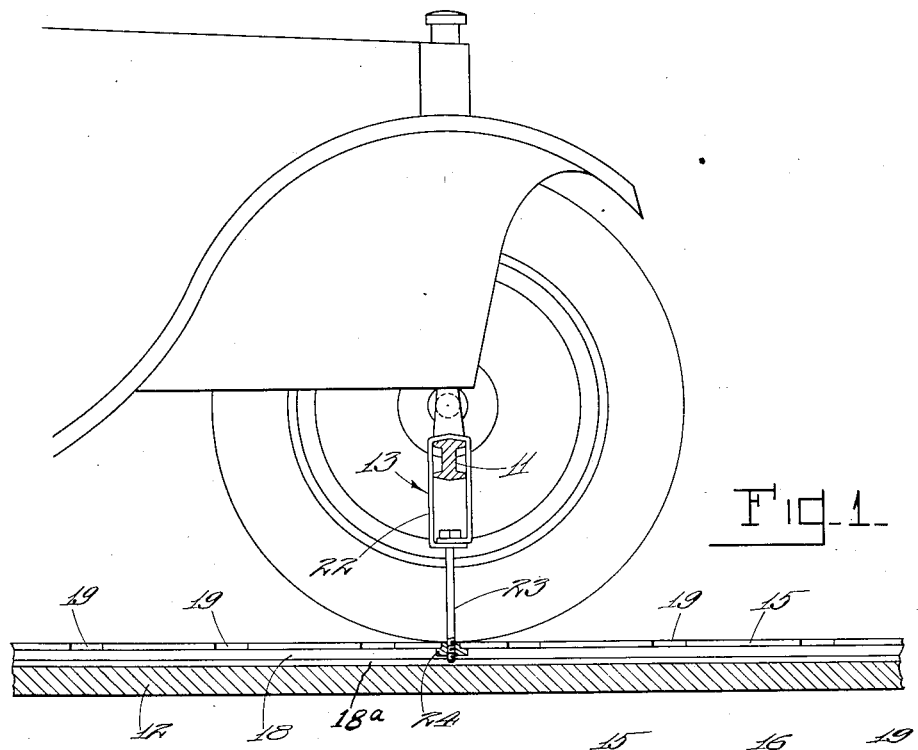

Patented Nov. 27, 1928.

1,693,184

UNITED STATES PATENT OFFICE.

VINCENT P. RUMELY, OF DETROIT, MICHIGAN, ASSIGNOR TO HUDSON MOTOR CAR COMPANY, OF DETROIT, MICHIGAN, A CORPORATION OF MICHIGAN.

VEHICLE ANCHORING DEVICE.

Application filed January 30, 1925. Serial No. 5,813.

This invention relates to an improved freight car floor for use primarily, though not exclusively, in shipping motor vehicles and to means for anchoring vehicles in the freight car while in transit. Motor vehicles are relatively heavy and therefore the movement and severe shocks to which the freight car is subjected cause the vehicles to be violently thrown from side to side and forwardly and backwardly, resulting in serious damage to the vehicle and the others in the car if the vehicle is not properly secured to the floor of the car. Various means have been provided for bracing vehicles during shipment against forward, backward and side movement as well as holding devices for preventing vertical movement of the vehicle. These anchoring devices have been spiked or nailed to the wooden floor of the freight car. The disadvantages of fastening the anchoring devices to the car floor in this manner are not confined to the likelihood of the spikes or nails being pulled out by the severe shocks to which the vehicles are subjected and endangering the safety of the shipments but severe damage to the wooden floor of the car also results. The same freight cars are used over and over again for shipping motor vehicles so that at the points in the car floor at which the anchoring devices are fastened the boards become splintered and torn away so that they will no longer adequately hold the anchoring devices. Not infrequently the anchoring devices when nailed to the damaged boards in the floor become loose during transit and the vehicles are seriously damaged. It is therefore necessary for the railroad companies to replace frequently the damaged parts of the car floor or to provide an entirely new flooring. The present invention eliminates the damage to the car floors thus greatly decreasing the cost of upkeep of the rolling stock used for shipping motor vehicles.

Viewed broadly this invention has for its object to provide means in the floor of a freight car to which anchoring devices which maintain the vehicle in place during transit can be anchored or fastened.

The invention will be fully understood from the following description when taken in connection with the accompanying drawings and the novel features thereof will be pointed out and clearly defined in the claims at the close of this specification.

In said drawings:

Fig. 1 is a diagrammatic view of the forward part of a motor vehicle showing a hold-down device applied to the front axle, the hold-down being secured to an anchorage in the car floor.

Fig. 2 is a fragmentary front view showing the hold-down secured to the floor anchorage.

Fig. 3 is a plan view of a portion of the anchorage in the car floor.

Figs. 4 and 5 are diagrammatic plan views of the floor of a freight car the floor anchorage being shown lengthwise of the floor in Fig. 4 and transversely thereof in Fig. 5.

Referring to Fig. 1 at 11 is shown the I-beam front axle of a vehicle, the vehicle being shown anchored to the floor 12 of a freight car, not shown, by means of the hold-down appliance generally indicated at 13. Two metal strips or rails 14 and 15 (see Figs. 2 and 3) are positioned in the car floor lengthwise of the car and held in place by any suitable means such as the bolts 16. These strips or rails are spaced apart to provide the channel 17. The car floor is also cut away beneath the rails 14 and 15 forming the recess or groove 18 in the floor, said rails and groove forming an undercut guideway. The rails 14 and 15 may extend throughout the entire length of the car or only for short distances at points at which it is customary to anchor the vehicles, it being understood that vehicles vary in length and the corresponding points at which the anchoring means are fastened will vary accordingly. The rails 14 and 15 are provided with notches which form entrance openings 19 for the lower end of the hold-down appliance 13 which is attached to the vehicle and anchored to the rails 14 and 15. The openings 19 in the channel 17 are located at convenient points a short distance apart throughout the entire length of the rails.

The hold-down appliance 13 may be of any convenient type but as shown consists of a metal strip 22 which is passed around the front axle of the vehicle, the overlapping ends of which receive the bolt 23. A nut 24 of a size larger than the channel 17 between the rails 14 and 15 but of a size to permit its introduction in the openings 19 is also provided. The nut 24 is slidable between the rails in the guideway formed by the channel 17 and groove 18 and may be moved along the rails 14 and 15 and conveniently positioned to receive the threaded end of the bolt 23. The groove 18 is preferably provided at its bottom with a sub-groove 18ª to receive the threaded end of the bolt 23 below the nut 24.

When a vehicle is placed in the car for shipment it is moved to the desired place on the car floor, the metal strip 22 and bolt 23 are applied to the front axle. The nut 24 is introduced through one of the openings 19 between the floor rails and the nut moved to a point beneath the bolt 23. The bolt 23 is then screwed into the nut until the hold-down appliance is sufficiently tight.

It will be understood that the hold-down may be applied to any convenient part of the vehicle and to the rear axle as well as the front axle and that more than one of these appliances may be used on each vehicle. Furthermore the rails 14 and 15 may be of any suitable type and attached to the car floor in any desired manner. The floor anchorage means for example may be in the form of a single strip or rail. The rails may run transversely of the car as shown in Fig. 5 and be located at convenient places in the floor for use with each vehicle and to accommodate vehicles of different lengths.

My floor anchorage may also be used to anchor compression braces such as shown in my co-pending application, brace for shipping vehicles in freight cars, Serial No. 741,828, filed October 6, 1924, as well as my tension type of brace which forms the subject matter of Patent No. 1,651,351, dated November 29, 1927, it being only necessary in each instance to secure the ends of the braces to the anchor rails in the floor instead of spiking them to wooden floor members.

What I claim is:

1. In combination, a freight car floor, a pair of rails secured to said floor, said rails being spaced apart to form a channel therebetween, an adjustable hold-down secured at its upper end to a vehicle, the lower end of said hold-down being insertable at a plurality of points between said rails.

2. The combination with a freight car floor having an undercut guideway, of a vehicle hold-down having a portion slidable in said guideway, said guideway having notches to permit the insertion and removal of said slidable portion.

3. The combination with a freight car floor having an undercut guideway, of a vehicle hold-down comprising a member slidable in said guideway and a member connected with the vehicle, said members being adjustably connected with each other to tighten said hold-down, said guideway having notches to permit the insertion and removal of said slidable member.

4. The combination with a freight car floor having an undercut guideway, of a vehicle hold-down comprising a nut slidable in said guideway, and a rod connected with the vehicle and in threaded engagement with said nut.

5. The combination with a freight car floor having an undercut guideway, of a vehicle hold-down comprising a nut slidable in said guideway, and a rod connected with the vehicle and in threaded engagement with said nut, said guideway having a sub-groove to receive the end of said rod below said nut.

In testimony whereof I affix my signature.

VINCENT P. RUMELY.